United States Patent
Lee et al.

(10) Patent No.: US 8,434,837 B2
(45) Date of Patent: *May 7, 2013

(54) REFRIGERATOR

(75) Inventors: Seungmok Lee, Gyeongsangnam-Do (KR); Bonggun Jung, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 331 days.

This patent is subject to a terminal disclaimer.

(21) Appl. No.: 12/830,641

(22) Filed: Jul. 6, 2010

(65) Prior Publication Data

US 2011/0005264 A1 Jan. 13, 2011

(30) Foreign Application Priority Data

| Jul. 8, 2009 | (KR) | 10-2009-0062271 |
| Jul. 24, 2009 | (KR) | 10-2009-0067965 |
| Jul. 24, 2009 | (KR) | 10-2009-0067967 |
| Aug. 17, 2009 | (KR) | 10-2009-0075878 |

(51) Int. Cl.
*A47B 96/04* (2006.01)

(52) U.S. Cl.
USPC .......................................................... 312/402

(58) Field of Classification Search .................. 312/402, 312/404, 319.5–319.8, 223.6; 318/466; 62/449, 62/440, 465

See application file for complete search history.

(56) References Cited

U.S. PATENT DOCUMENTS

| 3,101,922 A * | 8/1963 | Moody et al. ................ 248/27.3 |
| 3,674,970 A * | 7/1972 | Bedocs .......................... 200/295 |
| 3,887,777 A * | 6/1975 | Nishino ....................... 200/61.69 |
| 4,716,496 A * | 12/1987 | Fritsch ............................ 361/725 |
| 5,771,676 A * | 6/1998 | Komiya et al. ................ 59/78.1 |
| 5,913,439 A * | 6/1999 | Von Arx .......................... 220/3.7 |
| 6,101,819 A * | 8/2000 | Onaka et al. ..................... 62/125 |
| 6,371,584 B1* | 4/2002 | Alreck ........................ 312/235.1 |
| 6,416,022 B1* | 7/2002 | Crespi ............................. 248/49 |
| 6,621,692 B1* | 9/2003 | Johnson et al. ........... 361/679.55 |
| 6,787,702 B2* | 9/2004 | Suzuki ......................... 174/72 A |
| 6,940,019 B2* | 9/2005 | Ikeda et al. .................. 174/68.3 |
| 7,654,107 B2* | 2/2010 | Okuda et al. .................... 62/441 |
| 8,169,176 B2* | 5/2012 | Yu et al. ........................ 318/466 |
| 2006/0043087 A1* | 3/2006 | Gagas et al. .................... 219/391 |
| 2008/0191591 A1* | 8/2008 | Blucher et al. ............. 312/319.1 |
| 2008/0196751 A1* | 8/2008 | Poyner et al. ............... 134/57 D |
| 2008/0278046 A1* | 11/2008 | Scheffy et al. ............. 312/223.6 |

(Continued)

FOREIGN PATENT DOCUMENTS

| JP | 2000339947 | * 12/2000 |
| JP | 2005237766 | * 8/2005 |

*Primary Examiner* — Janet M Wilkens

(74) *Attorney, Agent, or Firm* — Fish & Richardson P.C.

(57) ABSTRACT

Disclosed is a refrigerator that has a slider and chain units that are coupled in a manner that allows rotation. The slider and chain units define a cable chain that covers a wire. Curve guide portions are positioned between the slider and a chain unit, and a rotation restricting portion is positioned between the chain units. The cable chain may curve in the same direction regardless of the force applied so as to reduce potential damage on the wire due to scratches by peripheral components and mis-operation of a refrigerator door. Also, a buffer may be installed at an end of a fixed rail to provide additional safety, a protection cover is installed at a driving motor to reduce potential for separation of the wire, and a door switch is installed at a rail guide to facilitate detachment of the door switch.

33 Claims, 20 Drawing Sheets

U.S. PATENT DOCUMENTS

| | | | |
|---|---|---|---|
| 2009/0102338 A1* | 4/2009 | Wenzel et al. | 312/319.1 |
| 2009/0243448 A1* | 10/2009 | Yu et al. | 312/319.5 |
| 2009/0301312 A1* | 12/2009 | Iwamoto et al. | 99/357 |
| 2010/0236279 A1* | 9/2010 | Eom et al. | 62/449 |
| 2011/0050065 A1* | 3/2011 | Lee et al. | 312/402 |
| 2011/0146333 A1* | 6/2011 | Koo et al. | 62/441 |

* cited by examiner

REFRIGERATOR

CROSS-REFERENCE TO RELATED APPLICATIONS

The present application claims priority to Korean Application No. 10-2009-0062271, filed on Jul. 8, 2009, Korean Application No. 10-2009-0067965, filed on Jul. 24, 2009, Korean Application No. 10-2009-0067967, filed on Jul. 24, 2009, and Korean Application No. 10-2009-0075878, filed on Aug. 17, 2009, which are herein expressly incorporated by reference in their entireties.

FIELD

The present disclosure relates to a refrigerator, and for example, to a refrigerator having drawer-type doors which automatically open and close.

BACKGROUND

In general, a refrigerator is a type of home appliance having storage spaces closed by refrigerator doors so as to store foods or the like at a low temperature. The refrigerator is configured to keep the foods or the like stored in the storage spaces in an optimized state by use of cool air generated responsive to heat exchange of a refrigerant circulating a refrigerating cycle.

SUMMARY

In one aspect, a refrigerator includes a refrigerator main body that defines a storage space and a refrigerator door coupled to the refrigerator main body and configured to slide back and forth to open and close the storage space of the refrigerator main body. The refrigerator also includes rail assemblies disposed between the refrigerator main body and the refrigerator door and configured to guide sliding of the refrigerator door. The refrigerator further includes a driving unit disposed at a side of one of the rail assemblies and configured to apply a driving force that facilitates a sliding movement of the refrigerator door. In addition, the refrigerator includes a cable chain that is disposed between the refrigerator main body and the driving unit, that is configured to accommodate and shield a wire that supplies electrical power to the driving unit, and that is configured to be flexible such that the cable chain transforms responsive to movement of the driving unit while continuing to shield the wire.

Implementations may include one or more of the following features. For example, the cable chain may include a slider and a chain coupled to the slider in a manner that allows the chain to rotate relative to the slider. The chain may include a plurality of chain units that are consecutively coupled to one another in a manner that allows the chain units to rotate relative to one another.

The refrigerator also may include a curve guide portion that is positioned between the slider and a chain unit and that defines a curve direction of the chain unit when the chain rotates with respect to the slider. The curve guide portion may be positioned such that a center line of the slider in a lengthwise direction that passes a rotation center between the slider and the chain unit, and a center line of the chain unit in a lengthwise direction form an acute angle in the curve direction. The curve guide portion may be configured such that at least one contact surface between the slider and the chain protrudes further than the same contact surface between another chain unit.

In some examples, the slider may include a guide and joints that are each provided with a link connection portion having one end rotatably coupled to a sliding portion of the guide and another end rotatably coupled to the chain unit. The chain unit may include a chain main body that has both ends open in a lengthwise direction thereof and that enables covering of the wire and a link connection portion positioned at each end of the chain main body in a lengthwise direction, and having one side rotatably coupled to the slider and another side coupled to another chain unit in a manner that allows the chain unit to rotate relative to the another chain unit. The chain unit also may include a rotation restricting portion extending from both lengthwise ends of an outer circumferential surface of the chain main body and overlaying an outer circumferential surface of a neighboring chain unit or the slider so as to restrict rotation of the neighboring chain unit or the slider.

The refrigerator may include a curve guide portion that protrudes, by a predetermined height, from at least one of an inner surface of the rotation restricting portion or an outer circumferential surface of the slider corresponding to the inner surface. An end of the rotation restricting portion may extend past a rotation center of the link connection portion. In addition, the rotation restricting portion may be positioned higher than the outer circumferential surface of the chain main body such that the chain main body is straightened when the chain is unrolled.

In some implementations, the link connection portion may extend from one end surface of the slider and from both ends of side circumferential surfaces of the chain unit in a lengthwise direction, and projections and corresponding holes may be defined at opposite locations at the outer surface of the link connection portion in the lengthwise direction so as to couple to the link connection portion of the slider or the link connection portion of another unit chain in a manner that enables rotation. The refrigerator also may include a cover portion extends, in the lengthwise direction, from an end of the outer circumferential surface of the chain main body corresponding to an opposite side of the rotation restricting portion. The cover portion may have one end that is shorter than the rotation center of the link connection portion.

Further, the refrigerator may include a curve guide portion that has a section at one of both ends of the inner circumferential surface of the chain main body cut out in the lengthwise direction such that the inner circumferential surface of the neighboring chain main body overlaps the curve guide portion to thereby cause curving at an overlapping portion. An end of the curve guide portion may be shorter than the rotation center of the link connection portion. The refrigerator also may include a guiding surface portion that is positioned at an outer surface of the link connection portion and that has a stepped shape. The guiding surface portion may be configured to receive a neighboring link connection portion that contacts the guiding surface portion and may be configured to restrict a rotation angle of the neighboring link connection portion.

In some implementations, the refrigerator may include a door switch disposed at an inner wall surface of the refrigerator main body. The door switch may be turned on or off responsive to opening or closing of the refrigerator door. In these implementations, the refrigerator may include a switch housing that has an opening and is disposed in the inner wall surface of the refrigerator main body, and a switch cover that accommodates the door switch and is coupled to the switch housing in a manner that enables detachment of the switch cover. The switch cover may be configured to be inserted in the switch housing and, thereby, cover the opening of the switch housing.

The refrigerator may include a groove having a predetermined depth positioned at the opening of the switch housing or at a side of the switch cover. The groove may be inclined toward the opening of the switch housing in a direction of the inner wall surface of the refrigerator main body. The switch cover may be provided with a fixed portion that is supported at the opening of the switch housing in an elastic manner.

In some examples, the refrigerator may include rail guides that are installed on the inner wall surface of the refrigerator main body and that accommodate the rail assemblies. In these examples, the switch housing may be integrally provided at a side of one of the rail guides.

In some implementations, each rail assembly may include a plurality of fixed rails fixed to the refrigerator main body and the door, respectively, and at least one movable rail that is configured to slide between the fixed rails. In these implementations, the refrigerator may include a buffer disposed at an end surface of the rail assembly facing the door. Also, in these implementations, the buffer may be installed at an end surface of the rail assembly disposed at the refrigerator main body.

The buffer may include a fixed portion coupled to a side surface of the fixed rail in a fixed manner and a cover portion that extends from the fixed portion and is positioned adjacent to an end surface of the fixed rail. The fixed portion may have a hole that allows the fixed portion to be secured with the fixed rail. The buffer may have a supporting surface that protrudes from a side of the cover portion by a predetermined height and contacts with a side surface near the end surface of the fixed rail.

The refrigerator may include a pressure sensor positioned at the buffer. The pressure sensor may be electrically connected to the driving unit and may be configured to cause restriction of a closing operation of the door responsive to a pressure value detected by the pressure sensor. The driving unit may include an actuator that is connected to the wire, that generates a driving force, and that uses the driving force to open and close the door. The actuator may include a wire connection flange having a stopping portion that secures the wire.

The refrigerator may include a protection cover that covers the wire and that is coupled to the actuator in a detachable manner. The protection cover may include a first fixed portion fixed to the wire connection flange, and a second fixed portion fixed to the actuator. The refrigerator also may include an extending portion that extends from the wire connection flange in one direction. The extending portion may be inserted in the protection cover in a fixed manner. The extending portion may include an elastic material that allows the extending portion to be fixed to the actuator in an elastic manner. The first fixed portion may have an insertion groove that enables insertion of the extending portion therein. The wire connection flange may be fixed to an upper portion of the actuator based upon a longitudinal direction of the refrigerator, and the second fixed portion may be engaged with a stopping member provided at a lower portion of the actuator.

DETAILED DESCRIPTION

In some implementations, a refrigerator includes a sliding drawer that is driven by a motor and includes structures for routing electrical power to the motor. The refrigerator may be any type of refrigerator having a drawer-type door. Throughout this disclosure, description is given of an example applied to a bottom-freezer type refrigerator. This description is for the sake of explanation only and the structures described throughout may be applied to other types of refrigerators.

Figure 1:
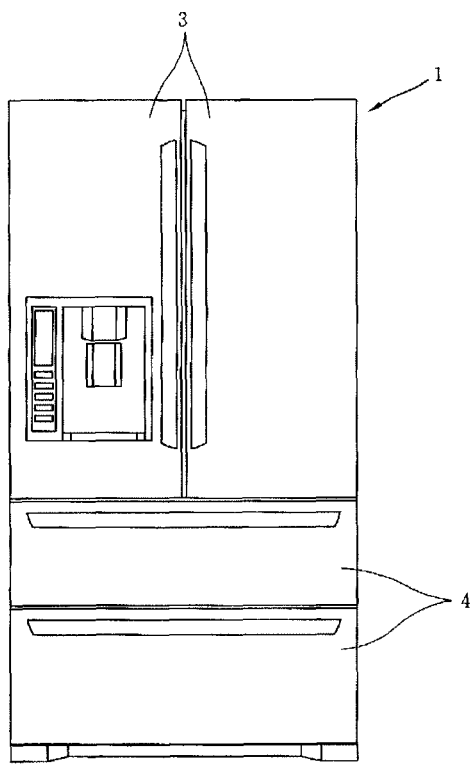
FIG. 1 is a front view of a bottom-freezer type refrigerator.
Figure 2:
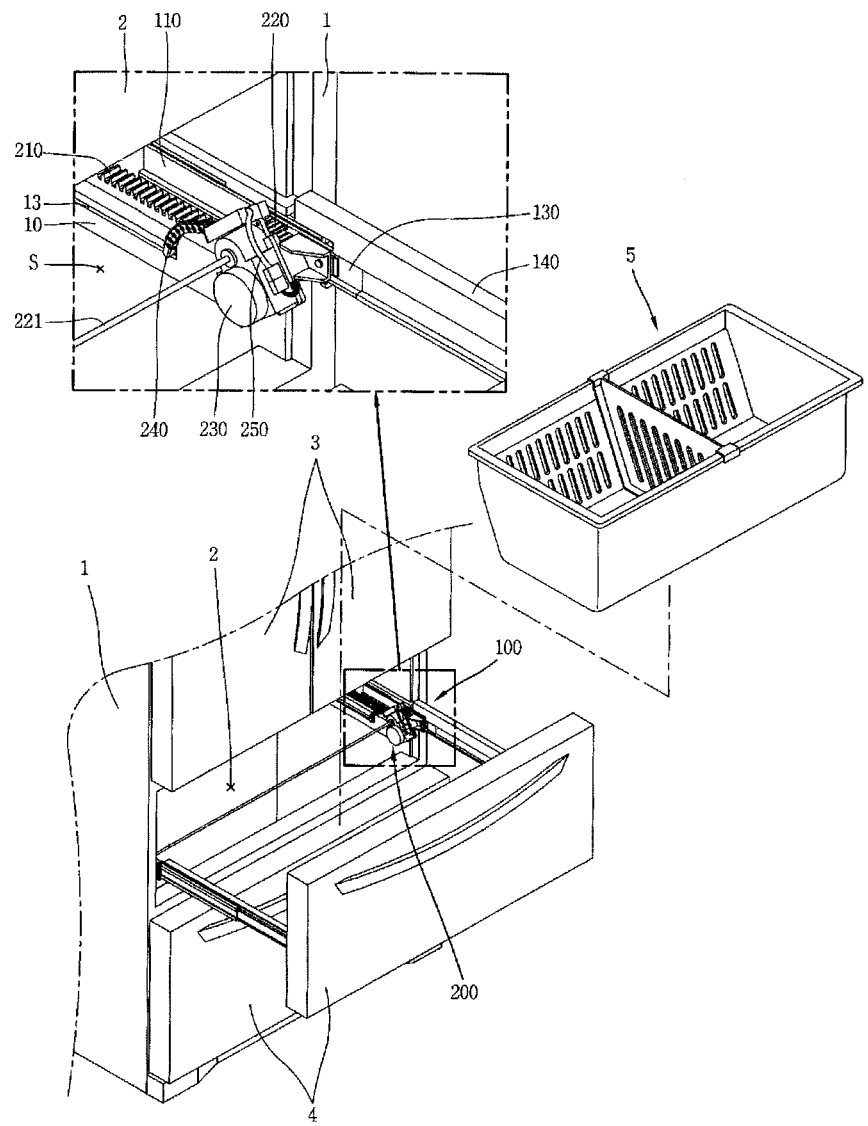
FIG. 2 is a perspective view showing a freezing chamber door of the refrigerator of FIG. 1 oriented in an open position and with a basket taken out.

FIG. 1 illustrates an example of a bottom-freezer type refrigerator, and FIG. 2 illustrates an example of a freezing chamber door of the refrigerator of FIG. 1 oriented in an open position and with a basket taken out. As shown in FIGS. 1 and 2, the refrigerator has an outer appearance which is defined by a main body 1 in a rectangular shape, and also has a storage space for storing foods therein. The storage space of the refrigerator main body 1 may be partitioned into upper and lower portions, thus to have a refrigerating chamber at the upper portion and a freezing chamber 2 at the lower portion.

An open front face of the refrigerating chamber may be closed by a pair of refrigerating chamber doors 3 located at right and left sides, and an open front face of the freezing chamber 2 may be closed by a single freezing chamber door or a plurality of upper and lower freezing chamber doors 4.

One side of each refrigerating chamber door 3 is coupled to the refrigerator main body 1 so as to be configured as hinged doors. Each freezing chamber door 4 is slidably coupled to the refrigerator main body 1 so as to be configured as a drawer-type door that slides open and closed.

Rail assemblies 100 for pulling out or pushing in the freezing chamber door 4 together with a basket 5 may be installed at both side wall surfaces within the freezing chamber 2, and a driving unit 200, which applies a driving force such that the freezing chamber door 4 is automatically pulled out or pushed in together with the basket 5, may be installed at one side of one of the rail assemblies 100.

The rail assemblies 100 may be extendable in multiple steps that enable the freezing chamber door 4 to slide back and forth between an open position and a closed position, and be accommodated into rail guides 10, which are fixed to the side wall surfaces within the freezing chamber 2.

The rail guides 10 may be provided at both right and left wall surfaces within the freezing chamber 2. The rail guides 10 may extend from the front side of the freezing chamber 2 to the rear side thereof, and secure to the wall surfaces within the freezing chamber 2 by separate coupling members such as screws or fixedly coupled to brackets which are already mounted to the wall surfaces of the freezing chamber 2.

Each of the rail guides 10, which are provided to mount the rail assemblies 100 which extend into the multiple steps, may be mounted to each of the right and left inner wall surfaces of the freezing chamber 2. Each rail guide 10 may be provided with a rail mounting portion 11 (see FIG. 3), which is formed by injecting a plastic material so as to accommodate the rail assembly 100 therein. A rack 210, which defines a part of the driving unit 200 and performs a relative motion together with a corresponding pinion 220 (discussed in more detail below), may extend at a lower portion of the rail guide 10 from a front end of the rail guide 10 to a rear end thereof. A chain guiding unit 12 (see FIG. 3) may be positioned at a lower portion of the rack 210. The chain guiding unit 12 may allow a cable chain 240, discussed in more detail below, to slide together with the freezing chamber door 4 in back and forth directions.

Each of the rail assemblies 100 may include a first fixed rail 110 fixed to the inner wall surface of the freezing chamber 2, a movable rail 120 (see FIG. 3) slidably coupled to the first fixed rail 110, and a second fixed rail 130 slidably coupled to another side surface of the movable rail 120 and fixed to the freezing chamber door 4.

The first fixed rail 110, the movable rail 120 and the second fixed rail 130 are sequentially overlaid to slide by being rolled by bearings provided within each of them.

For example, the first fixed rail 110 may be accommodated within the rail guide 10 to be fixedly coupled to the inner side of the rail mounting unit 11 in a snap-fit manner. The movable rail 120, which moves back and forth while performing a relative motion with the first fixed rail 110 and the second fixed rail 130, may be disposed between the fixed rail 110 and the second fixed rail 130. The second fixed rail 130, which is fixed to the freezing chamber door 4 to be movable back and forth with performing a relative motion with the movable rail 120, may be provided inside the movable rail 120.

A rail cover 140 that facilitates accommodation of the basket 5 may be disposed at an inner side surface of the second fixed rail 130. The rail cover 140 may have a length corresponding to that of the second fixed rail 130 in a lengthwise direction of the second fixed rail 130. Then, one end of the rail cover 140 may be fixedly coupled to the second fixed rail 130, and another end thereof may be fixedly coupled to the inner side surface of the freezing chamber door 4.

The driving unit 200 may include racks 210 disposed at the rail guide 10, pinions 220 coupled to the rail assembles 100 and allowing the freezing chamber door 4 to be pulled out or pushed in together with the basket 5 while rotating in an engaged state with the racks 210, and a driving motor 230 coupled to the pinions 220 so as to deliver a driving force to the pinions 220.

The rack 210 may be positioned at each rail guide 10, as described above, to extend in back and forth directions. The rack 210 may be integral with the rail guide 10, or be coupled to the rail guide 10 as a separate component. If necessary, the rack 210 may be independently disposed within the freezing chamber 2 without being coupled to the rail guide 10.

The pinion 220 may be rotatably coupled to a rear end portion of an inner side of the second fixed rail 130. The pinion 220 may be coupled to the corresponding rack 210 by a gear so as to execute a relative motion with the rack 210 at the same time when the rail assembly 100 is slid. The pinions 220 are provided at both right and left sides one by one such that rotational centers of both the pinions 220 are connected by virtue of one transmission shaft 221.

The driving motor 230 may include a bidirectionally rotating motor which is capable of selecting a forward rotation and a reverse rotation. A rotational shaft of the driving motor 230 is coupled to the transmission shaft via an intermediate gear, and a wire for applying power to the driving motor 230 is accommodated in a cable chain 240 so as to allow an electric connection between the driving motor 230 and an external power source. A middle portion of the cable chain 240 may be slidably coupled to a lower side of the rail guide 10, namely, a lower side of the rack 210.

An example process of pulling out or pushing in the freezing chamber door in the refrigerator is described. For instance, if the freezing chamber door 4 is pulled out, the freezing chamber door 4 is drawn out frontwardly and the driving motor 230 cooperatively rotates in an opening direction. The pinions 220 then rotate in the opening direction in the engaged state with the racks 210, and accordingly the freezing chamber door 4 is drawn out frontwardly together with the basket 5. Simultaneously, the rail assemblies 100 are slid to be gradually drawn out frontwardly while a relative motion is executed between the first fixed rail 110 and the movable rail 120 and between the movable rail 120 and the second fixed rail 130. Consequently, the freezing chamber door 4 is gradually changed to an open state and the basket 5 is exposed externally as much as possible, whereby foods can be stored in or taken out of the basket 5.

On the other hand, if the freezing chamber door 4 is pushed in backwardly, the freezing chamber door 4 is moved inwardly or backwardly, and the driving motor 230 cooperatively rotates in a closing direction. The pinions 220 then rotate in the closing direction in the engaged state with the racks 210, and accordingly the freezing chamber door 4 is moved inwardly together with the basket 5. Simultaneously, the rail assemblies 100 are slid in an opposite direction to the opening direction to be overlaid. Consequently, the freezing chamber door 4 is gradually changed to a closed state and the basket 5 is completely pushed into the freezing chamber 2, whereby foods filled in the basket 5 can be kept in a frozen state.

Figure 3:
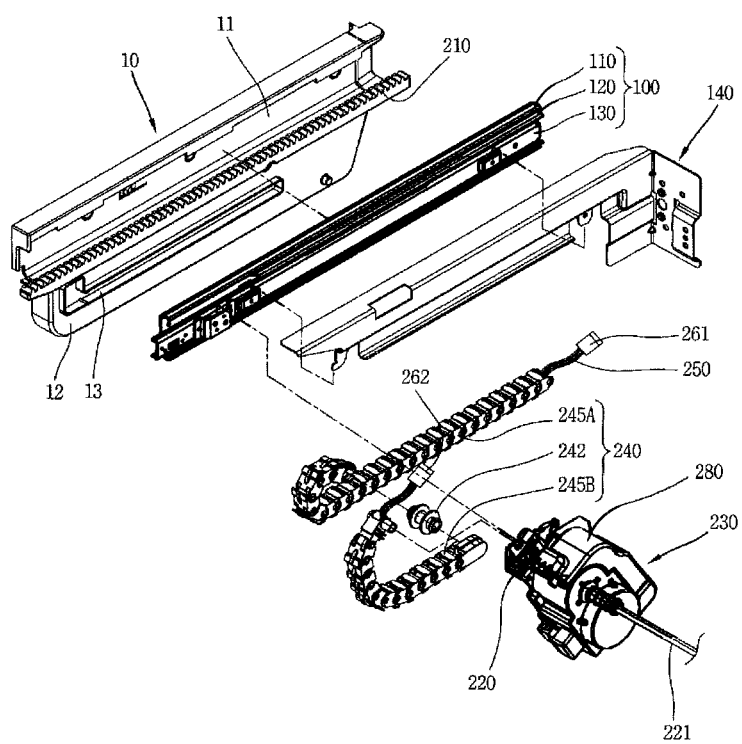
FIG. 3 is a perspective view showing a disassembled state of a rail assembly and a cable chain shown in FIG. 2.
Figure 4:
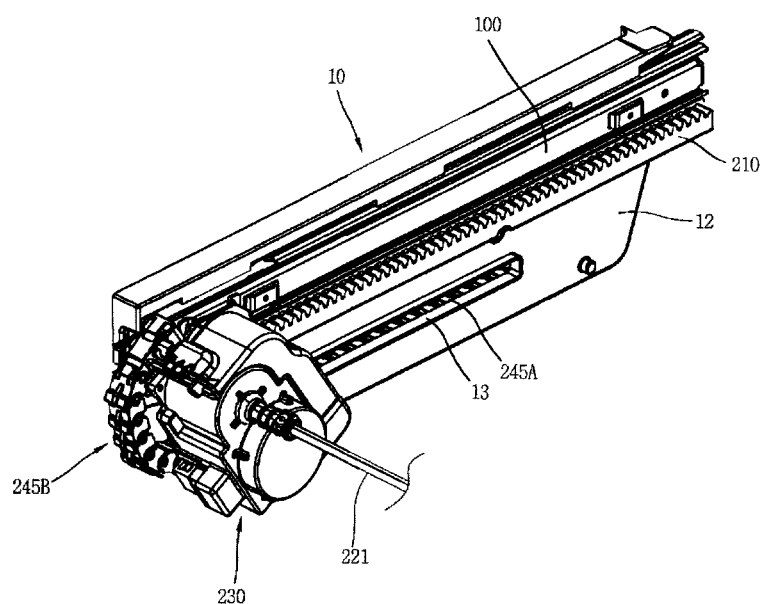
FIG. 4 is a front perspective view showing an assembled state of the rail assembly and the cable chain shown in FIG. 2.
Figure 5:
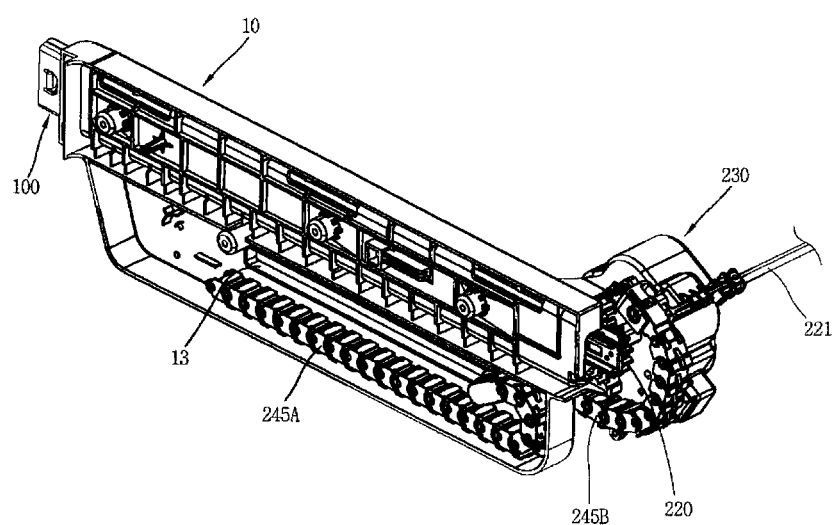
FIG. 5 is a rear perspective view showing the assembled state of the rail assembly and the cable chain shown in FIG. 2.
Figure 6:
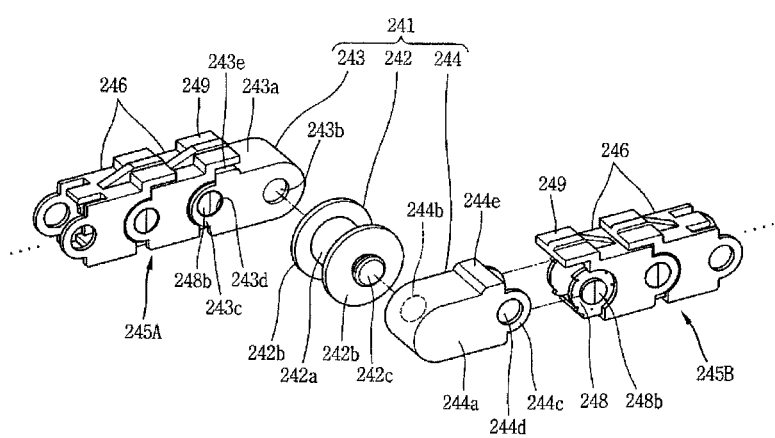
FIGS. 6 and 7 are a disassembled perspective view and a planar view, respectively, of a slider.
Figure 7:
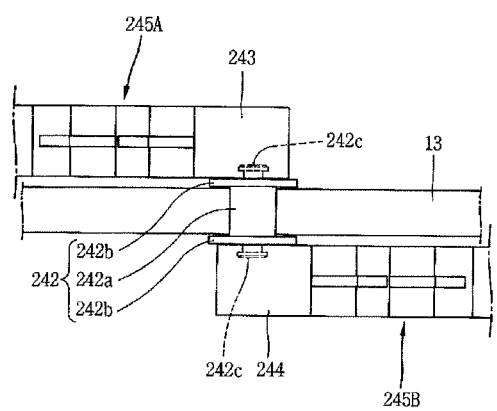
Figure 8:
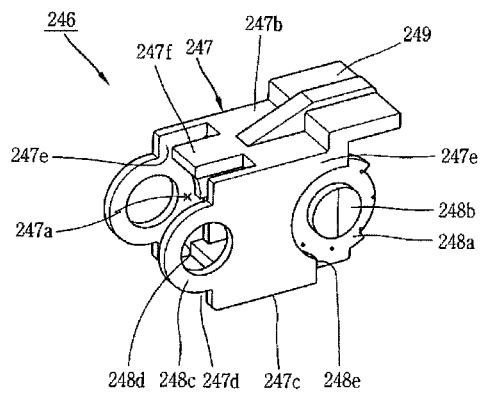
FIG. 8 is a perspective view showing a unit chain of a cable chain.
Figure 9:
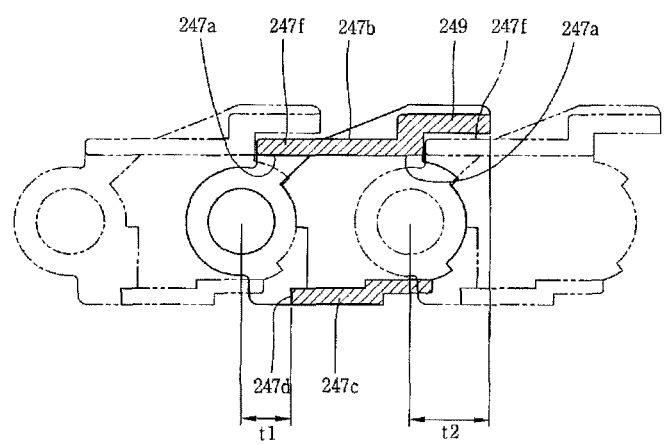
FIG. 9 is a longitudinal sectional view showing an assembled state of unit chains of the cable chain shown in FIG. 8.

Here, each of the rail assembly and the cable chain may be described in more detail with reference to FIGS. 3 to 9. FIG. 3 illustrates an example of a disassembled state of a rail assembly and a cable chain shown in FIG. 2. FIG. 4 illustrates an example of an assembled state of the rail assembly and the cable chain shown in FIG. 2. FIG. 5 illustrates an example of the assembled state of the rail assembly and the cable chain shown in FIG. 2. FIGS. 6 and 7 illustrate an example of a slider. FIG. 8 illustrates an example of a unit chain of a cable chain. FIG. 9 illustrates an example of an assembled state of unit chains of the cable chain shown in FIG. 8.

Referring to FIGS. 2 to 9, with the configuration of the refrigerator, the driving motor 230 is installed at the freezing chamber door 4 and another end of a wire 250 having one end coupled to the driving motor 230 for applying power thereto is connected to the refrigerator main body 1. Accordingly, when the freezing chamber door 4 is automatically opened or closed, the length of the wire 250 should flexibly change.

In some implementations, the length of the wire 250 can be adjusted in a manner of rolling or unrolling the wire 250 responsive to the location of the driving motor 230, namely, the opening or closing operation of the freezing chamber door 4, other than the manner of flexibly varying the length of the wire 250 itself. In this case, the wire 250 may be installed in an exposed state. In the exposed state, the variation operation of rolling or unrolling the wire 250 may be performed irregularly. As a result, a scratch or suspension may occur due to peripheral components.

In view of those problems, the refrigerator is configured such that the wire 250 is covered with the cable chain 240, which is flexibly transformed with a predetermined trace, thereby protecting the wire 250 from the peripheral components and allowing smooth opening and closing of the freezing chamber door 4.

The cable chain 240 may be configured by rotatably coupling a plurality of unit chains consecutively in a lengthwise direction. A housing for accommodating the cable chain 240 may be separately installed at one side wall surface of the freezing chamber, namely, a side wall surface near the driving motor 230, or the cable chain 240 may be slidably installed at a lower portion of the rack 210 of the rail guide 10.

The rail guide 10 may be secured to each of both side wall surfaces of the freezing chamber 2. Each of the rail guides 10 may include a rail mounting unit 11 positioned at an upper portion thereof to allow coupling of the rail assembly 100 (see FIG. 3) thereto. The rack 210 may be positioned at a portion corresponding to a middle height of the rail guide 10 to extend in back and forth directions.

The rail guide near the driving motor 230 of both the rail guides 10 may be provided with a chain guide unit 12 provided at the lower side of the rack 210 for accommodating part of the cable chain 240. A guide slot 13, to which a slider 241 of the cable chain 240 (discussed in more detail below) is slidably coupled, may be provided at a middle portion of the chain guide unit 12 to extend in back and forth directions. A rear end of the guide slot 13 may be curved upwardly whereby the slider 241 is suspended within the guide slot 13 when the freezing chamber door 4 is completely closed.

Referring to FIGS. 3 to 5, the cable chain 240 may include a slider 241 slidably coupled to the guide slot 13, a first chain 245A rotatably coupled to one end of the slider 241 and accommodated in the chain guide unit 12, and a second chain 245B rotatably coupled to another end of the slider 241 and exposed outside the chain guide unit 12, namely, outside the rail guide 10. A first power source terminal 261 for connection with an external power source may be coupled to the wire 250 at an end of the first chain 245A, and a second power source terminal 262 for connection with the driving motor 230 may be coupled to the wire 250 at an end of the second chain 245B.

Referring to FIGS. 6 and 7, the slider 241 may include a guide 242 slidably coupled to the guide slot 13, and first and second joints 243 and 244 rotatably coupled to both side ends of the guide 242. Another end of the first joint 243 may be rotatably coupled to one end of the first chain 245A, and another end of the second joint 244 may be rotatably coupled to one end of the second chain 245B.

The guide 242 may include a sliding portion 242a having a circular section to be slidably inserted into the guide slot 13 of the rail guide 10, and stoppers 242b positioned at both ends of the sliding portion 242a and extending up to a predetermined height in a radial direction for maintaining the guide 242 within the guide slot 13. Rotation projections 242c, which are rotatably coupled to rotation holes 243b and 244b of the joints 243 and 244, may be positioned at outer side surfaces of the stoppers 242b, respectively.

The first joint 243 and the second joint 244 may be provided with joint main bodies 243a and 244a, respectively, both in a rectangular form. Rotation holes 243b and 244b, to which the rotation projections 242c of the guide 242 are rotatably coupled, respectively, may be positioned at first ends of the joint main bodies 243a and 244a, respectively. Link connection portions (hereinafter, referred to as 'first link connection portion') 243c and 244c, which allow second ends of the joint main bodies 243a and 244a to be rotatably coupled to the link connection portions (hereinafter, referred to as 'second link connection portions') 248 of corresponding unit chains 246 (discussed in more detail below), may be positioned at the second ends of the joint main bodies 243a and 244a and at opposite sides of the rotation holes 243b and 244b. The rotation holes 243b and 244b may use a ball joint mechanism, and the first link connection portions 243c and 244c may use a hinge mechanism.

In some examples, each of the first link connection portions 243c and 244c of the joints 243 and 244 may have a length as long as being overlaid with the second link connection portion 248 of the unit chain 246, as discussed in more detail below. Link holes (hereinafter, referred to as 'first link holes') 243d and 244d may be positioned such that link projections 248b provided at the second link connection portions 248 of the unit chains 246 are rotatably coupled to the first link connection portions 243c and 244c of the joints 243 and 244.

A rotation center of each first link hole 243d and 244d may be located at least at a side outer than an end of a rotation restricting portion 249 of the unit chain 246, namely, closer to the unit chain 246. Thus, the unit chain 246 can be curved in a direction that defines an acute angle by virtue of curve guide portions (hereinafter, referred to as 'second curve guide portions') 247d (discussed in more detail below).

Curve guide portions (hereinafter, referred to as 'first curve guide portions') 243e and 244e may be positioned at ends of the joint main bodies 243a and 244a facing the unit chains 246 on outer circumferential surfaces of the joint main bodies 243a and 244a, namely, on surfaces defining the outer circumferential surfaces when the cable chain 240 is rolled up to be curved. The rotation restricting portions 249 of the unit chains 246 comprising the first cable chain 245A and the second cable chain 245B are laid on the first curve guide portions 243e and 244e such that the unit chains 246 are rolled up to be curved in a particular direction.

Figure 10:
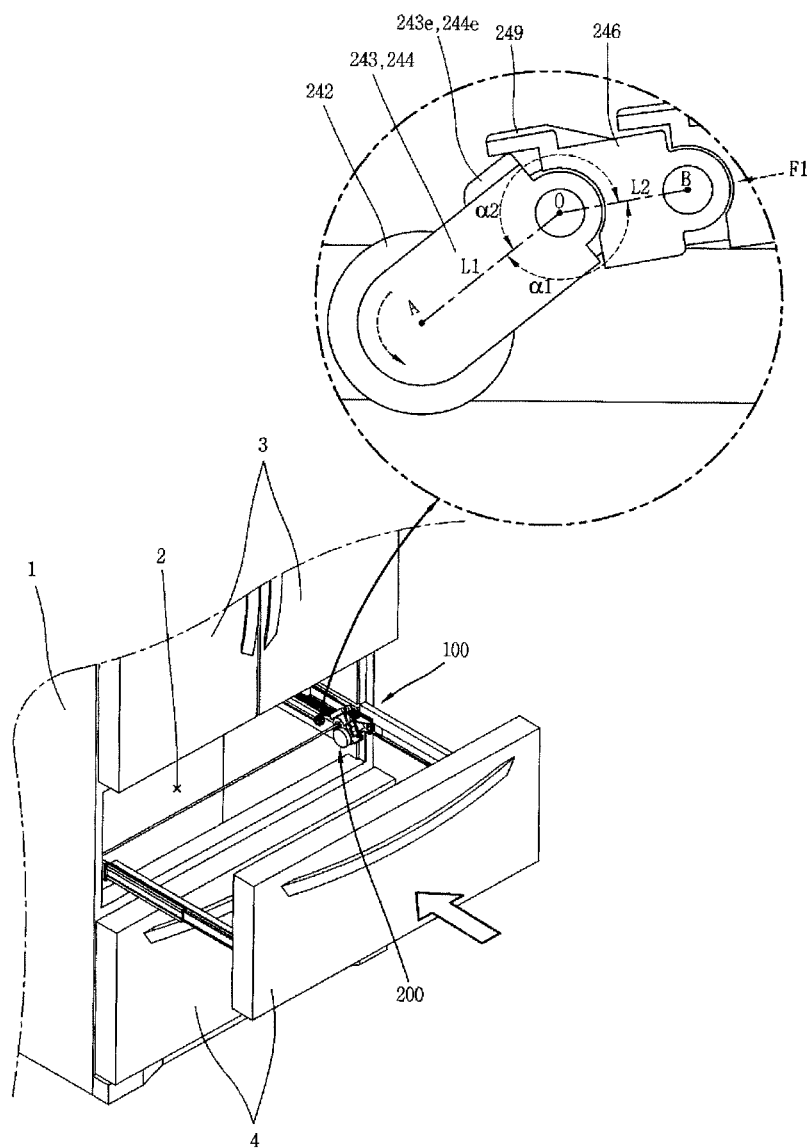
FIG. 10 is a view showing a curved state of the slider and the chains of the cable chain when a door is oriented in a closed position.

Preferably, the first curve guide portions 243e and 244e may be positioned higher, by a predetermined height, than the outer circumferential surfaces of the joint main bodies 243a and 244a of the joints 243 and 244. Hence, as shown in FIG. 10, two center lines passing the rotation centers of the joints 243 and 244 and each unit chain 246, namely, the lengthwise center line L1 of the joints 243 and 244 and the lengthwise center line L2 of the unit chain 246 may not form a straight line but form an acute angle α1 and an obtuse angle α2 such that the joints 243 and 244 and the unit chains 246 can be curved in a direction of the acute angle α1. Alternatively, the first curve guide portions 243e and 244e may be positioned on inner circumferential surfaces of the rotation restricting portions 249 of each unit chain 246 as well as on the outer circumferential surfaces of the joints 243 and 244, or be positioned on both the joints 243 and 244 and the unit chains 246.

Ends of the first curve guide portions 243e and 244e may be located inside further than at least the rotation centers of the link projections 243d and 244d of the joints 243 and 244 such that the unit chains 246 can be curved in the direction of the acute angle α1 by virtue of the first curve guide portions 243e and 244e.

Referring to FIGS. 8 and 9, the unit chain 246 may include a chain main body 247 having circumferential surfaces 247a at both open ends in a lengthwise direction thereof such that the wire 250 is inserted through the open ends, a plurality of link connection portions (hereinafter, referred to as 'second link connection portion') 248 positioned at both ends of the chain in a lengthwise direction of the chain main body 247, and having one side rotatably coupled to a chain main body 247 of another unit chain 246 and another side coupled to the joints 243 and 244 of the slider 241, respectively, and a rotation restricting portion 249 extending from an outer circumferential surface 247b of the chain main body 247, namely, from an end (e.g., a front end) of both lengthwise ends of a surface defining an outer circumferential surface when the cable chain 240 rolls up so as to be locked by being overlaid on the outer circumferential surface 247b of the neighboring chain main body 247 or on the outer circumferential surfaces of the joints 243 and 244 of the slider 241.

The chain main body 247 may have a rectangular section, and be provided with curve guide portions (hereinafter, referred to as 'second curve guide portions) 247d, which are positioned at both ends in the lengthwise direction of the chain main body 247 on an inner circumferential surface 247c, namely, on a surface defining the inner circumferential surface when the cable chain 240 rolls up, by being cut out as deep as a predetermined depth. Accordingly, the inner circumferential surface 247c of the chain main body 247 of the neighboring unit chain 246 or an inner circumferential surface 241b of each joint 243 and 244 of the slider 241 can be overlaid with the second curve guide portions 247d such that the overlaid connection portion can be rolled up. Referring to FIGS. 8 and 9, an end of the curve guide portion 247d may be shorter than the rotation center of the link connection portion 248 by a predetermined length t1, for example, such that two neighboring unit chains 246 are rolled up in a direction of the inner circumferential surface thereof or in the direction of the inner circumferential surface of the slider 241.

The second link connection portions 248 may extend from ends of both side circumferential surfaces 247e of the chain main body 247 in a semi-circular shape in a lengthwise direction. Of the link of the connection portions 248, link projections 248b may protrude from outer surfaces of link connection portions (hereinafter, referred to as 'front side link connection portion') 248a positioned at a front side, and link holes 248d for rotatable insertion of the link projections 248b of the unit chain or the link projections 243d and 244d of the slider 241 may be positioned at outer surfaces of link connection portions (hereinafter, referred to as 'rear side link connection portion') 248c positioned at a rear side. Guiding surface portions 248e may be positioned around the link projections 248b so as to restrict the rotation angles of the rear side link connection portions 248c when the front side link connection portions 248a of another unit chain 246 or the link connection portions 243c and 244c of the slider 241 are attached thereto. The rotation restriction angles of the guiding surface portions 248e may be set approximately the same as the rotation restriction angles of the first curve guide portions 243e and 244e or the second curve guide portions 247d, thereby restricting a curved angle of the unit chain 246.

The rotation restricting portion 249 may integrally extend from one side of the outer circumferential surface 247b of the chain main body, for example, from a front end thereof. An end of the rotation restricting portion 249 may be longer than the rotation center of the first link connection portions 243c and 244c or the second link connection portions 248 by a predetermined length t2, namely, extend to be more protruded than the centers of the link projections 248b, thereby restricting curving of another unit chain 246.

The rotation restricting portion 249 may be higher than the outer circumferential surface 247b of the chain main body 247, which allows the chain main bodies 247 to form an approximately straight line when being unrolled, whereby the wire 250 accommodated in the cable chain 240 can be straightened.

A cover portion 247f for shielding exposure of the wire 250 may extend, in a lengthwise direction of the chain main body 247, from an end of the outer circumferential surface 247b of the chain main body 247 corresponding to an opposite side of the rotation restricting portion 249. The cover portion 247f may have an end shorter than the rotation center of the link connection portion 248, which allows the unit chains 246 to be straightly unrolled. To ensure the rotation restricting portion 249 is not too long in length, the cover portion 247f may be long enough to enable the rotation restricting portion 249 of the neighboring unit chain 246 to be overlaid thereon.

In using the example cable chain described with respect to FIGS. 2 to 10, the following operating effects may be achieved. For example, when the freezing chamber door 4 is open, the cable chain 240 is slid frontwardly along the guide slot 13 disposed at the rail guide 10. Responsive to this, the unit chains 246 are unrolled long enough to maximize the length of the cable chain 240. When the freezing chamber door 4 is closed, the cable chain 240 is slid backwardly along the guide slot 13 of the rail guide 10. Responsive to this, the unit chains 246 are rolled into a circular form so as to minimize the length of the cable chain 246.

Figure 11:
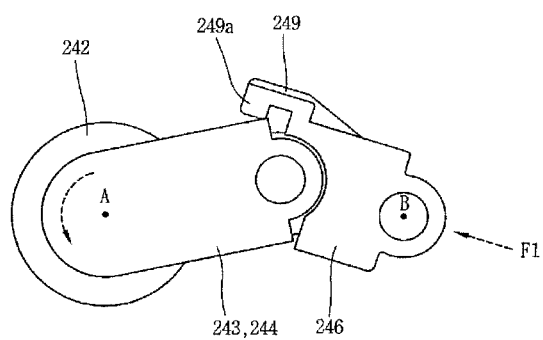
FIGS. 11 and 12 are views showing a curve guide unit of the cable chain.
Figure 12:
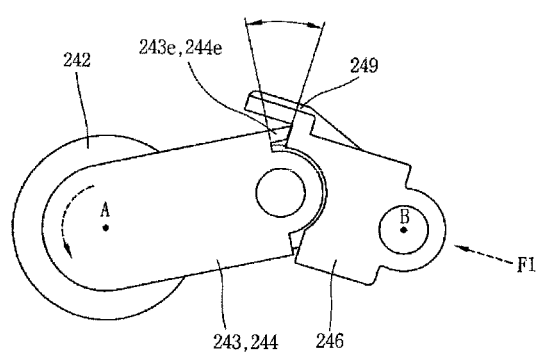

The relation between the slide and the unit chains of the cable chain when the freezing chamber door is closed is shown in FIGS. 10 to 12. FIG. 10 illustrates an example of a curved state of the slider and the chains of the cable chain when the door is oriented in a closed position, and FIGS. 11 and 12 illustrate other examples of a curve guide portion of the cable chain.

Referring to FIG. 10, when the freezing chamber door 4 starts to be closed, namely, when the cable chain 240 starts to be rolled into a circular form, the unit chain 246 applies a force F1 for closing the freezing chamber door 4 toward the joints 243 and 244. Accordingly, if the force F1, which is applied from the unit chain 246 toward the joints 243 and 244, is applied to a connected point O between the unit chain 246 and each joint 243 and 244, the unit chain 246 may bi-directionally rotate based upon the connected point O with each joint 243 and 244 so as to be curved. Consequently, the wire 250 accommodated in the cable chain 240 is rolled or unrolled along an irregular track to thereby be scratched or locked at its peripheral components, which may cause failure of opening or closing of the freezing chamber door 4.

However, with the configuration described, as the first curve guide portions 243e and 244e are positioned between the joints 243 and 244 and the unit chains 246, when the freezing chamber door 4 starts to close, the force F1 applied by the unit chain 246 is deviated from the connected point O between the unit chain 246 and the joints 243 and 244.

Accordingly, an acute angle is formed between a center line L1 of the joints 243 and 244 and a center line L2 of the unit chain 246, so as to allow the cable chain 240 to be curved in the direction of the acute angle. Thus, the curved direction of the cable chain 240 can be maintained in the same direction, thereby stabilizing the movement of the cable chain 240. Hence, the damages on the cable chain 240 or the internal wire 250 can be reduced. It is also possible to reduce the possibility of the closing operation of the freezing chamber door 4 interfering with the cable chain 240.

In the example shown in FIG. 10, the curve guide portion is a projection at the outer circumferential surface of each joint. In the example shown in FIG. 11, a curve guide portion 249a is positioned at an outer circumferential surface of the unit chain 246 contacting the outer circumferential surface of each joint 243 and 244. In this example, the curve guide portion 249a may have a predetermined height at an inner surface of the rotation restricting portion 249 of each unit chain 246.

Operating effects of the curve guide portion according to this example are the same or similar to that of the previous examples described above. Since the curve guide portion is positioned at the rotation restricting portion, as long as the rotation restricting portion comes in contact with the joints 243 and 244 or other cable chains 246, the curve guide portion may be operated. As such, this structure may be advantageous in the operation.

FIG. 12 illustrates another example of the curve guide portion. As shown in FIG. 12, the curve guide portions 243e and 244e are configured by defining the length of the outer circumferential surface of the joints 243 and 244 to be longer than the length of the inner circumferential surface thereof. In this structure, the section of the outer circumferential surface of each joint 243 and 244 may be inclined so as to contact a facing surface of the unit chain 246, which may be advantageous in applying a force.

Operating effects of the curve guide portion according to this example are the same or similar to those of the examples described above. In this example, the curve guide portion extends the length of the outer circumferential surface of the joint, which may remarkably decrease possibility of occurrence of mis-operation, resulting in further improving operation efficiency.

Figure 13:
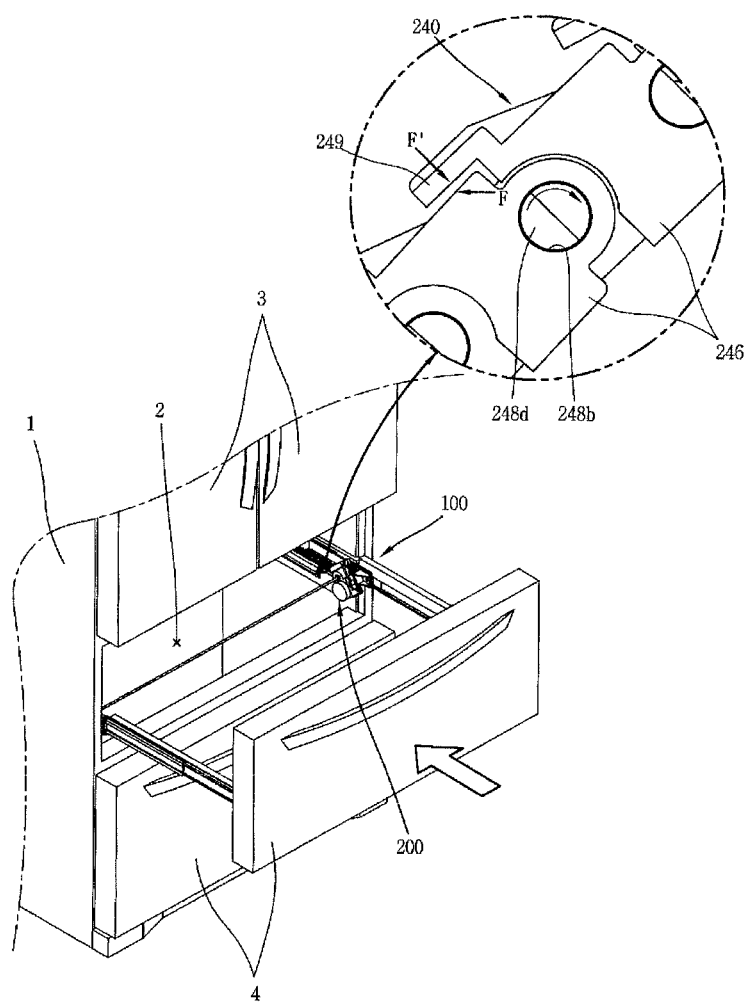
FIG. 13 is a view showing that the chains of the cable chain are curved when a door is oriented in a closed position.

In addition, the relation between the unit chains of the cable chain when the freezing chamber door is closed is shown in FIG. 13. FIG. 13 illustrates an example where the unit chain of the cable chain is curved when the door is oriented in a closed position.

Referring to FIG. 13, when the freezing chamber door 4 starts to close, namely, when the cable chain 240 starts to be rolled into a circular form, if the rotation direction is not restricted by the link connection portions 248, the cable chain 240 may be curved in a zigzag form due to the force F1 applied in the lengthwise direction. Consequently, as mentioned above, the wire 250 accommodated in the cable chain 240 is rolled or unrolled along an irregular track to thereby be scratched or locked at its peripheral components, which may cause failure of opening or closing of the freezing chamber door 4.

However, the example described in FIG. 13 provides the rotation restricting portion 249 for each unit chain 246 of the cable chain 240. Hence, the cable chain 240 may be curved uniformly defining one circular track in a direction as indicated with an arrow in the drawing, while the unit chains 246 rotate by the neighboring link connection portions 248. That is, if the cable chain 240 is applied by a force F toward a left side in the drawing, the rotation restricting portion 249 is locked at the outer circumferential surface 247b of the neighboring unit chain 246. As a result, a repulsive force F' is generated in an oblique direction in the drawing. Consequently, the cable chain 240 is curved in a uniform direction, as similar to the rotation direction of the arrow in the drawing, while the unit chains 246 rotate by the neighboring link connection portions 248.

In addition, the rail assembly 100 is disposed at the freezing chamber door 4 of the freezing chamber. Accordingly, when the freezing chamber door 4 is slid to be open, an accident that a user's finger is caught in the rail assembly 100, especially, in the front end surface of the first fixed rail 110, may occur due to the user's carelessness in use. In this case, while the freezing chamber door 4 is automatically closed, the finger may be caught between the freezing chamber door 4 and the first fixed rail 110 to thereby be wounded. However, as described below, if a buffer is installed at an end of the first fixed rail 110, even if a finger or the like is caught in the end surface of the first fixed rail 110 when the freezing chamber door 4 is closed, the flexible buffer is employed at the end surface of the first fixed rail 110, thereby reducing the likelihood of these types of wounds or injuries.

Figure 14:
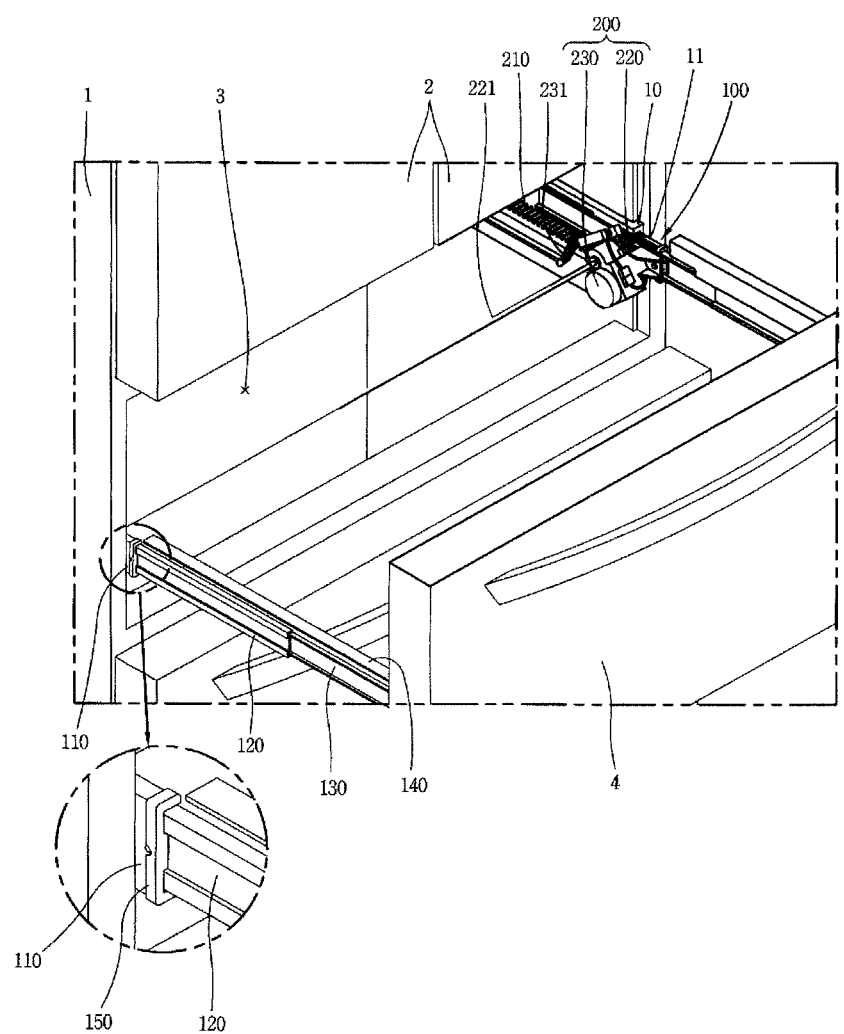
FIG. 14 is a perspective view of a refrigerator that illustrates a fixed rail having a buffer in the refrigerator according to FIG. 2.
Figure 15:
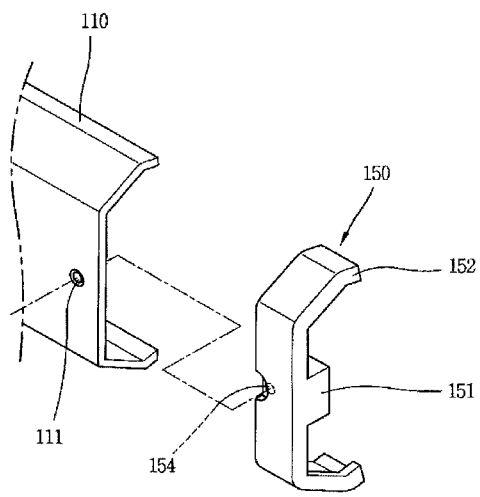
FIG. 15 is a perspective view showing a separated state of the buffer in the refrigerator according to FIG. 14.
Figure 16:
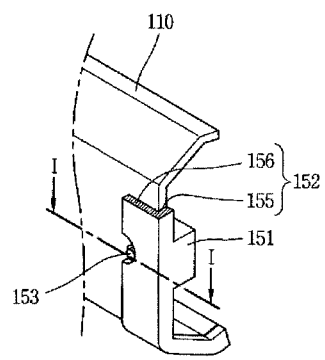
FIG. 16 is a perspective view showing an assembled state of the buffer in the refrigerator according to FIG. 14.
Figure 17:
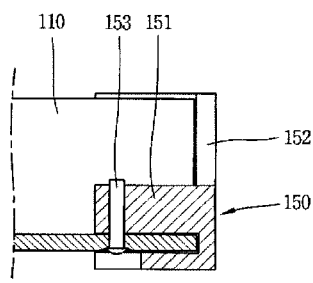
FIG. 17 is a sectional view taken along the line "I-I" of FIG. 16.
Figure 18:
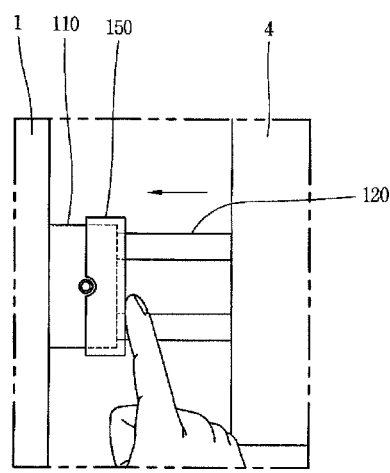
FIG. 18 is a view showing an operational effect of a safety device of the refrigerator.

FIG. 14 illustrates an example of a fixed rail having a buffer in the refrigerator according to FIG. 2, FIG. 15 illustrates an example of a separated state of the buffer in the refrigerator according to FIG. 14, FIG. 16 illustrates an example of an assembled state of the buffer in the refrigerator according to FIG. 14, FIG. 17 is a sectional view taken along the line "I-I" of FIG. 16, and FIG. 18 illustrates an example of an operational effect of a safety device of the refrigerator.

Referring to FIGS. 14 to 17, the buffer 150 may include a fixed portion 151 inserted into the first fixed rail 110, and a cover portion 152 extending from both sides of the fixed portion 151 for covering an end surface of the first fixed rail 110.

The fixed portion 151 may protrude by a predetermined length in a lengthwise direction of the first fixed rail 110, and a caulking hole 154 for caulking the fixed portion 151 to a coupling hole 111 of the fixed rail 110 using a rivet 153 or the like may be positioned at a middle part of the fixed portion 151.

The cover portion 152 may be thick enough to have a buffering capacity, and may be approximately the same as the shape of the end of the first fixed rail 110. The cover portion 152 may be positioned such that its attached surface, namely, an attached surface 155 facing an end surface of the first fixed rail 110 may be planar. However, in order to restrict the buffer 150 from being pushed in a horizontal direction, a supporting surface 156 having a predetermined height may be positioned along both sides of the buffer 150 or one side thereof (an example of being positioned along one side in the drawing), so as to allow insertion of the end of the first fixed rail 110.

In some implementations, a pressure sensor may be provided within the buffer. The pressure sensor may be electrically connected to the driving unit so as to restrict the closing operation of the drawer by virtue of pressure detected by the pressure sensor.

A refrigerator having the safety device described above may have the following operating effects. For example, if a user slightly pushes the freezing chamber door 4, the driving motor 230 is driven to be rotated in a closing direction. Both pinions 220 are responsively rotated in the closed direction by the transmission shaft 221, which is connected to a rotation shaft of the driving motor 230, so as to be slid toward the rear side along the racks 210.

Accordingly, the second fixed rails 130 coupled to the pinions 220 in a fixed state to the freezing chamber door 4 so as to overlap the movable rail 120, thereby being slid into the first fixed rail 110. Consequently, the freezing chamber door 4 is slid back into the freezing chamber 2 together with the basket 5.

Here, as shown in FIG. 18, if a user's finger is located on a front end of the first fixed rail 110 due to the user's carelessness in use, the finger may be caught between the freezing chamber door 4 and the first fixed rail 110 when the freezing chamber door 4 is closed, thereby possibly being injured. However, the employment of the buffer 150 having elasticity at the end of the first fixed rail 110 can reduce the likelihood of the finger from being injured due to being caught in the sharp end of the first fixed rail 110. Furthermore, if the buffer 150 is provided with a pressure sensor, when the pressure sensor is pressed, a warning signal is generated. Upon receiving the signal, the driving unit is stopped or rotated in a reverse direction, thereby further effectively reducing the likelihood of injury of the finger or the like.

In addition, when the freezing chamber door 4 is slid back and forth, the driving motor 230 moves together with the freezing chamber door 4. During this operation, a tensile force is applied to the wire 250, which may cause breakaway of the wire 250 or separation of the wire 250 from the driving motor 230. To address this problem, a protection cover may be provided at the driving motor 230.

Figure 19:
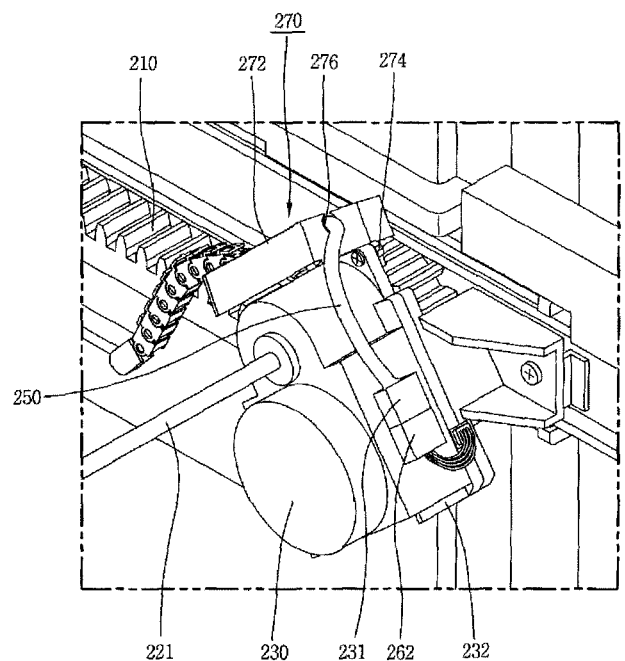
FIG. 19 is an enlarged perspective view of a driving motor according to FIG. 2.
Figure 20:
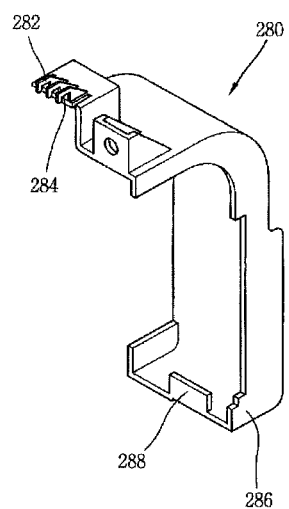
FIG. 20 is a perspective view showing a protection cover of the driving motor of FIG. 2.
Figure 21:
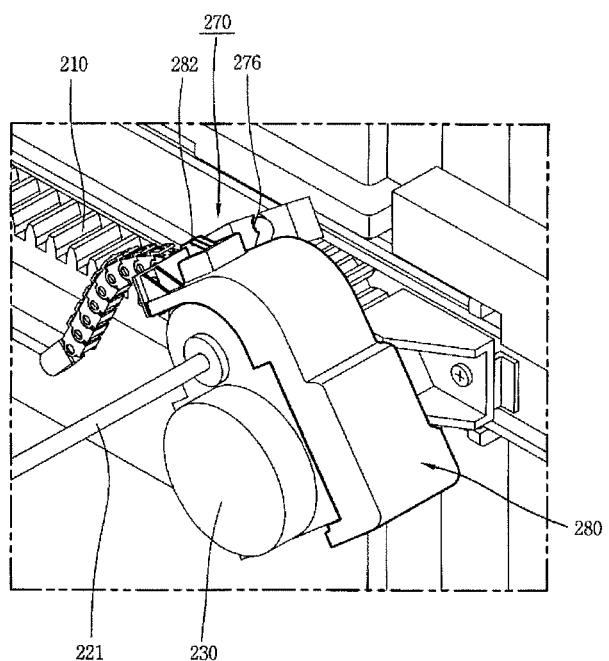
FIG. 21 is a perspective view showing a coupled state of the protection cover to the driving motor according to FIGS. 19 and 20.

FIG. 19 illustrates an example of a driving motor according to FIG. 2, FIG. 20 illustrates an example of a protection cover of the driving motor of FIG. 2, and FIG. 21 illustrates an example of a coupled state of the protection cover to the driving motor according to FIGS. 19 and 20.

Referring to FIGS. 19 to 21, a motor side connector 231 for connecting the driving motor 230 to the wire 250 may be provided at a lower portion of the driving motor 230, and the driving motor 230 and the wire 250 may be coupled to each other via the motor side connector 231 and a wire side connector 262.

A wire connection flange 270 may be coupled to an upper side of the driving motor 230 by a bolt. The wire connection flange 270 is a separate component from the driving motor 230, and has an extending portion 272 extending approximately in parallel to an upper surface of the driving motor 230. The extending portion 272 may be spaced apart from the surface of the driving motor 230 with a predetermined interval, and made of an elastic material so as to be elastically transformed when an external force is applied thereto. In addition, the extending portion 272 may have a rectangular section with a narrow width.

A hook 276 as a stopping portion for fixing the wire 250 may be located adjacent to a bolt coupling portion 274 of the wire connection flange 270. The hook 276 may have an inner diameter smaller than a diameter of the wire 250 for allowing a stable fixing of the wire 250.

In a state of fixing the wire 250 in the hook 276, the protection cover 280 may be coupled to the surface of the driving motor 230 so as to cover the wire 250 and the two connectors 231 and 262. The protection cover 280 may generally have a shape similar to an arch. Both end portions of the protection cover 280 may serve as a first fixed portion 282 coupled to the wire connection flange 270 and a second fixed portion 286 coupled to the lower portion of the driving motor 230.

In detail, an insertion groove 284 for inserting the extending portion 272 of the wire connection flange 270 therein may be positioned at the first fixed portion 282, and a protrusion 288 may be positioned at the second fixed portion 286 so as to be engaged with a stopping member 232, which protrudes from the lower surface of the driving motor 230. Therefore, in a state of inserting the extending portion 272 into the insertion groove 284, the protection cover 280 is fixed to the driving motor 230 by rendering the stopping member 232 engaged with the protrusion 288.

Here, the extending portion 272 may be elastically transformed to facilitate attachment or detachment of the protection cover 280, and additionally, after being coupled, the extending portion 272 may apply an elastic force to the protection cover 280 such that the protection cover 280 can be stably secured with the driving motor 230.

The separate employment of the protection cover for protecting the wire exposed out of the actuator and the wire connection flange for fixing the wire exposed out of the protection cover can reduce the likelihood of the connected portion between the actuator and the wire from being loose or separated during use or assembly, thereby potentially enhancing reliability and productivity of products.

Further, in case of installing a door switch for sensing opening or closing of the freezing chamber door 4 at an inner wall surface of the refrigerator, a lamp may be turned on responsive to the opening or closing of the freezing chamber door 4, thereby facilitating the user's operation of storing foods or taking foods out. For instance, if the freezing chamber door 4 is open, the door switch, which was pressed by the freezing chamber door 4, more particularly, by the basket 5, is released so as to deliver a signal, thereby stopping the operation of a compressor and simultaneously turning on the lamp disposed in an inner space of the refrigerator, resulting in facilitating the user's operation of storing or taking out foods.

However, if the door switch is out of order due to a long-term use of the refrigerator or other reasons, the door switch should be repaired or replaced. In this case, the door switch is detached for repair or replacement.

In some examples, if the door switch is inserted in an inner wall surface, namely, an inner case of the refrigerator main body 1, the inner case of the refrigerator may be curved or damaged, due to its thin thickness, during detachment. However, as shown in FIG. 22, if the door switch is installed at the rail guide 10 for accommodating the rail assembly 100 and coupled to the inner wall surface of the refrigerator main body 1, the likelihood of damage of the door switch which may occur during detachment may be reduced.

Figure 22:
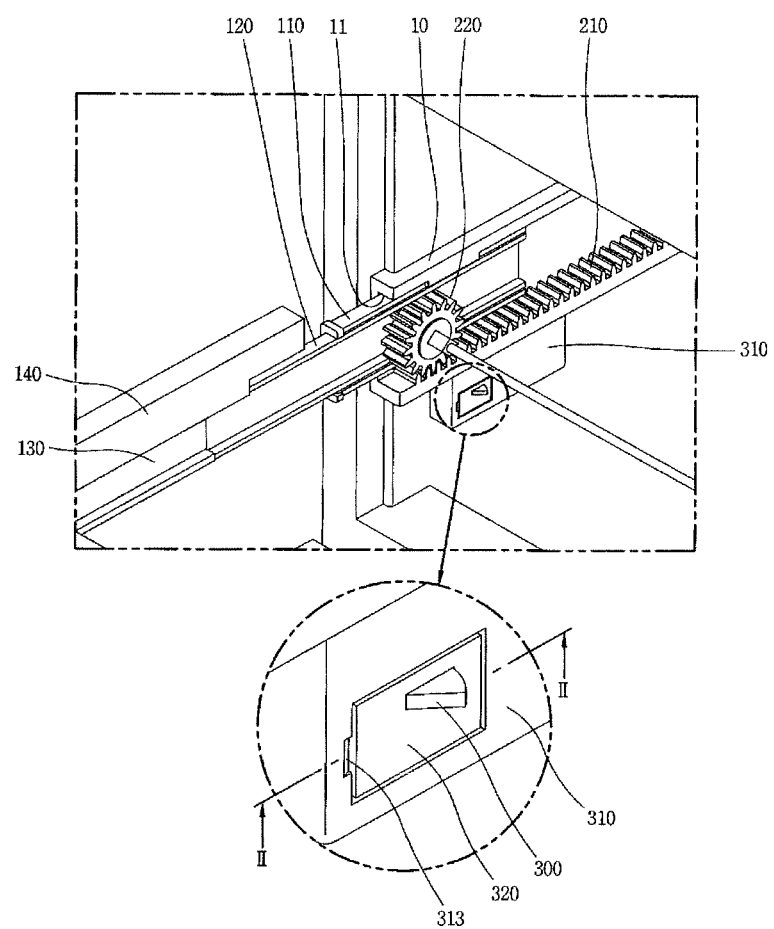
FIG. 22 is an enlarged perspective view of a door switch of the refrigerator according to FIG. 2.
Figure 23:
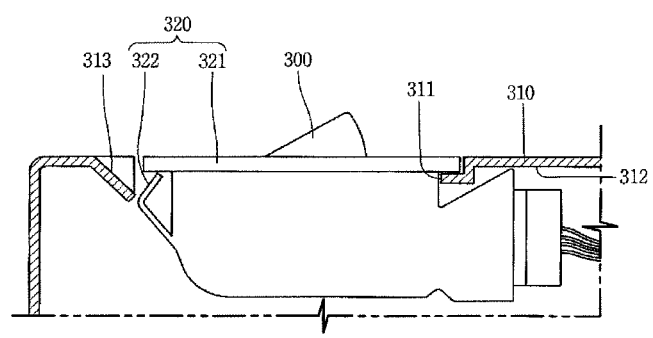
FIG. 23 is a sectional view taken along the line "II-II" of FIG. 22.
Figure 24:
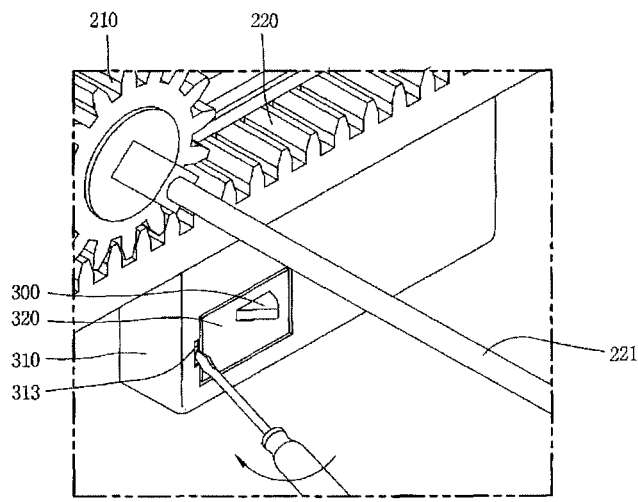
FIG. 24 and FIG. 25 are views showing a process of separating the door switch.
Figure 25:
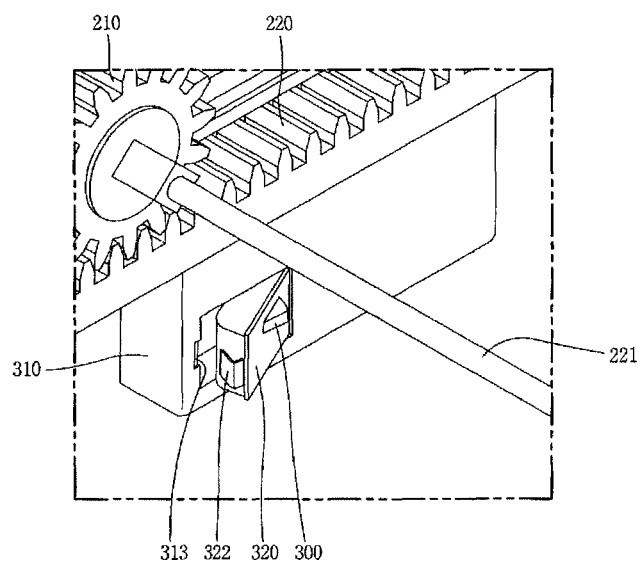

FIG. 22 illustrates an example of a door switch of the refrigerator according to FIG. 2, FIG. 23 is a sectional view taken along the line "II-II" of FIG. 22, and FIG. 24 and FIG. 25 illustrate an example of a process of separating the door switch.

As shown in FIGS. 22 to 25, the door switch 300 may include a switch housing 310 attached onto the inner wall surface of the refrigerator main body 1, and a switch cover 320 coupled to the switch housing 310 and supporting the door switch 300.

Here, the switch housing 310 may be provided integrally at one side of the rail guide 10, namely, at a lower portion of the rail guide 10, which is coupled to the inner wall surface of the refrigerator main body 1 to accommodate the rail assembly 100. The switch housing 310 may have a predetermined depth, namely, depth enough to stably accommodate the door switch 300 together with the switch cover 320. Also, the switch housing 310 may have a box-like shape that an inner side surface facing the freezing chamber is shown having an opening 311 whereas another surface is blocked. Alternatively, a draw-out hole 312 for drawing the wire out may be defined at one surface of the switch housing 310.

A separation groove 313 for facilitating separation of the switch cover 320 may be formed near the opening of the switch housing 310, namely, at a surface corresponding to the front side of the freezing chamber. Here, the switch housing 310 may preferably have intensity stronger than at least the intensity of the inner case of the refrigerator main body 1.

The separation groove 313 may have a stepped configuration. However, in order to set a tool such as a driver, as a lever, in the insertion groove 313, the separation groove 313 may have an inclination surface which is further inclined toward the opening.

The switch cover 320 may include a cover portion 321 positioned at an outer circumferential surface of the door switch 300 in a flange shape so as to cover the opening 311 of the switch housing 310, and a fixed portion 322 positioned at one side of the cover portion 321, namely, at a side surface corresponding to the separation groove 313 so as to be fixedly inserted into the opening 311.

In some examples, the separation groove may be positioned at one side surface of the cover portion 321, namely, at an edge of a surface corresponding to the switch housing 310. The separation groove, as described above, may have an inclination surface, which is inclined in a direction of the inner wall surface of the freezing chamber.

The fixed portion 322 may have an approximately wedge-shaped section, as shown in FIG. 23, and be in a form of a band upon projecting through a side surface so as to have elasticity. The fixed portion 322 may have a thickness enough to be elastically transformed by being pressed by an edge surface of the opening 311 of the switch housing 310 when the switch cover 320 is pushed in the switch housing 310 or drawn out thereof.

A process of drawing out the door switch from a door switch fixing device of the refrigerator is described below. For example, in a state where the door switch 300 is pushed in the switch housing 310, the fixed portion 322 of the switch cover 320 is elastically locked at the edge surface of the opening 311 of the switch housing 310, thereby maintaining the pushed-in state.

Under this state, if the door switch 300 is to be drawn out of the switch housing 310, an operator inserts a sharp tool, such as a screwdriver, into the separation groove 313 of the switch housing 310, as shown in FIG. 24. If the driver is rotated based upon the separation groove 313 in the direction indicated by an arrow in the drawing, the fixed portion 322 of the switch cover 320 is pressed by the rotation force so as to be unlocked from the opening 311 of the switch housing 310. Accordingly, as shown in FIG. 25, the door switch 300 is rotated together with the switch cover 320 based upon an opposite side of the separation groove 313, thereby being separated from the switch housing 310.

As such, the switch housing for accommodating the door switch therein is provided at the inner wall surface of the refrigerator main body, namely, separate from the inner case, whereby a groove for accommodating the door switch is not needed to be formed at the inner case, thereby facilitating fabrication and foaming of the inner case of the refrigerator main body and enhancing the productivity thereof.

Also, the formation of the switch housing separate from the inner case can reduce the likelihood of damage on the inner wall surface of the refrigerator main body or a user's injury, which may occur upon separating the door switch for repair and maintenance.

In addition, if the switch housing for installing the door switch is integrally formed with the rail guide, a space for installation of the door switch can be easily provided, resulting in reduction of the fabrication cost.

The cable chain described throughout may be applied to other products each having an automatically open/closed door, as well as the door of the refrigerator.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A refrigerator comprising:
  a refrigerator main body that defines a storage space;
  a refrigerator door coupled to the refrigerator main body and configured to slide back and forth to open and close the storage space of the refrigerator main body;
  rail assemblies disposed between the refrigerator main body and the refrigerator door and configured to guide sliding of the refrigerator door;
  a driving unit disposed at a side of one of the rail assemblies and configured to apply a driving force that facilitates a sliding movement of the refrigerator door; and
  a cable chain that is disposed between the refrigerator main body and the driving unit, that is configured to accommodate and shield a wire that supplies electrical power to the driving unit, and that is configured to be flexible such that the cable chain transforms responsive to movement of the driving unit while continuing to shield the wire.

2. The refrigerator of claim 1, wherein the cable chain comprises:
  a slider; and
  a chain coupled to the slider in a manner that allows the chain to rotate relative to the slider, the chain including a plurality of chain units that are consecutively coupled to one another in a manner that allows the chain units to rotate relative to one another.

3. The refrigerator of claim 2, further comprising a curve guide portion that is positioned between the slider and a first chain unit included in the plurality of chain units and that defines a curve direction of the first chain unit when the chain rotates with respect to the slider.

4. The refrigerator of claim 3, wherein the curve guide portion is positioned such that a center line of the slider in a lengthwise direction that passes a rotation center between the slider and the first chain unit and a center line of the first chain unit in a lengthwise direction form an acute angle in the curve direction.

5. The refrigerator of claim 3, wherein the curve guide portion is configured such that at least one contact surface between the slider and the chain protrudes further than the same contact surface between a second chain unit.

6. The refrigerator of claim 2, wherein the slider comprises:
  a guide; and
  joints that are each provided with a link connection portion having one end rotatably coupled to a sliding portion of the guide and another end rotatably coupled to a first chain unit.

7. The refrigerator of claim 2, wherein a first chain unit comprises:
  a chain main body that has both ends open in a lengthwise direction thereof and that enables covering of the wire;
  a link connection portion positioned at each end of the chain main body in a lengthwise direction, and having one side rotatably coupled to the slider and another side coupled to a second chain unit included in the plurality of chain units in a manner that allows the second chain unit included in the plurality of chain units to rotate relative to the first chain unit; and a rotation restricting portion extending from both lengthwise ends of an outer circumferential surface of the chain main body and overlaying an outer circumferential surface of the slider so as to restrict rotation of the slider.

8. The refrigerator of claim 7, further comprising a curve guide portion that protrudes, by a predetermined height, from at least one of an inner surface of the rotation restricting portion or an outer circumferential surface of the slider corresponding to the inner surface.

9. The refrigerator of claim 7, wherein an end of the rotation restricting portion extends past a rotation center of the link connection portion.

10. The refrigerator of claim 7, wherein the rotation restricting portion is positioned higher than the outer circumferential surface of the chain main body such that the chain main body is straightened when the chain is unrolled.

11. The refrigerator of claim 7, wherein the link connection portion extends from one end surface of the slider and from both ends of side circumferential surfaces of the second chain unit in a lengthwise direction, and projections and corresponding holes are defined at opposite locations at the outer surface of the link connection portion in the lengthwise direction so as to couple to the link connection portion of the slider or the link connection portion of the second chain unit in a manner that enables rotation.

12. The refrigerator of claim 11, further comprising a guiding surface portion that is positioned at an outer surface of the link connection portion and that has a stepped shape, the guiding surface portion being configured to receive a neighboring link connection portion that contacts the guiding surface portion and being configured to restrict a rotation angle of the neighboring link connection portion.

13. The refrigerator of claim 7, wherein a cover portion extends, in the lengthwise direction, from an end of the outer circumferential surface of the chain main body corresponding to an opposite side of the rotation restricting portion, the cover portion having one end that is shorter than the rotation center of the link connection portion.

14. The refrigerator of claim 7, further comprising a curve guide portion that has a section at one of both ends of the inner circumferential surface of the chain main body cut out in the lengthwise direction such that the inner circumferential surface of a neighboring chain main body overlaps the curve guide portion to thereby cause curving at an overlapping portion, an end of the curve guide portion being shorter than the rotation center of the link connection portion.

15. The refrigerator of claim 1, further comprising a door switch disposed at an inner wall surface of the refrigerator main body, the door switch being turned on or off responsive to opening or closing of the refrigerator door.

16. The refrigerator of claim 15, further comprising:
a switch housing that has an opening and is disposed in the inner wall surface of the refrigerator main body, and
a switch cover that accommodates the door switch and is coupled to the switch housing in a manner that enables detachment of the switch cover, the switch cover being configured to be inserted in the switch housing and, thereby, cover the opening of the switch housing.

17. The refrigerator of claim 16, further comprising a groove having a predetermined depth positioned at the opening of the switch housing or at a side of the switch cover.

18. The refrigerator of claim 17, wherein the groove is inclined toward the opening of the switch housing in a direction of the inner wall surface of the refrigerator main body.

19. The refrigerator of claim 17, wherein the switch cover is provided with a fixed portion that is supported at the opening of the switch housing in an elastic manner.

20. The refrigerator of claim 16, further comprising rail guides that are installed on the inner wall surface of the refrigerator main body and that accommodate the rail assemblies,
wherein the switch housing is integrally provided at a side of one of the rail guides.

21. The refrigerator of claim 1, wherein each rail assembly comprises a plurality of fixed rails fixed to the refrigerator main body and the door, respectively, and at least one movable rail that is configured to slide between the fixed rails, further comprising:
a buffer disposed at an end surface of the rail assembly facing the door.

22. The refrigerator of claim 21, wherein the buffer is installed at an end surface of the rail assembly disposed at the refrigerator main body.

23. The refrigerator of claim 22, wherein the buffer comprises:
a fixed portion coupled to a side surface of the fixed rail in a fixed manner; and
a cover portion that extends from the fixed portion and is positioned adjacent to an end surface of the fixed rail.

24. The refrigerator of claim 23, wherein the fixed portion has a hole that allows the fixed portion to be secured with the fixed rail.

25. The refrigerator of claim 23, wherein the buffer has a supporting surface that protrudes from a side of the cover portion by a predetermined height and contacts with a side surface near the end surface of the fixed rail.

26. The refrigerator of claim 21, further comprising a pressure sensor positioned at the buffer, the pressure sensor being electrically connected to the driving unit and being configured to cause restriction of a closing operation of the door responsive to a pressure value detected by the pressure sensor.

27. The refrigerator of claim 1, wherein the driving unit comprises an actuator that is connected to the wire, that generates a driving force, and that uses the driving force to open and close the door.

28. The refrigerator of claim 27, wherein the actuator includes a wire connection flange having a stopping portion that secures the wire.

29. The refrigerator of claim 27, further comprising a protection cover that covers the wire and that is coupled to the actuator in a detachable manner, the protection cover comprising a first fixed portion fixed to the wire connection flange, and a second fixed portion fixed to the actuator.

30. The refrigerator of claim 29, further comprising an extending portion that extends from the wire connection flange in one direction, the extending portion being inserted in the protection cover in a fixed manner.

31. The refrigerator of claim 30, wherein the extending portion includes an elastic material that allows the extending portion to be fixed to the actuator in an elastic manner.

32. The refrigerator of claim 30, wherein the first fixed portion has an insertion groove that enables insertion of the extending portion therein.

33. The refrigerator of claim 29, wherein the wire connection flange is fixed to an upper portion of the actuator based upon a longitudinal direction of the refrigerator, and the second fixed portion is engaged with a stopping member provided at a lower portion of the actuator.

* * * * *